(12) United States Patent
Kagawa et al.

(10) Patent No.: US 9,187,002 B2
(45) Date of Patent: Nov. 17, 2015

(54) CONNECTOR

(71) Applicant: Panasonic Corporation, Osaka (JP)

(72) Inventors: Takuya Kagawa, Kyoto (JP); Tetsuji Shibata, Osaka (JP); Jun Goda, Osaka (JP); Haeree Lee, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 218 days.

(21) Appl. No.: 14/029,946

(22) Filed: Sep. 18, 2013

(65) Prior Publication Data
US 2014/0091759 A1 Apr. 3, 2014

(30) Foreign Application Priority Data

Sep. 28, 2012 (JP) ................................. 2012-217613

(51) Int. Cl.
*B60L 11/18* (2006.01)
*B60L 3/04* (2006.01)

(52) U.S. Cl.
CPC ............... *B60L 11/1818* (2013.01); *B60L 3/04* (2013.01); *B60L 11/1816* (2013.01); *Y02T 10/7005* (2013.01); *Y02T 90/14* (2013.01)

(58) Field of Classification Search
CPC .................................................. B60L 11/1818

USPC ........................................................... 320/109
See application file for complete search history.

(56) References Cited

U.S. PATENT DOCUMENTS

2011/0181104 A1* 7/2011 Kamaga .................... 307/9.1
2013/0127261 A1 5/2013 Kagawa et al.

FOREIGN PATENT DOCUMENTS

JP 2010-110055 5/2010

* cited by examiner

*Primary Examiner* — Thuan Do
(74) *Attorney, Agent, or Firm* — Greenblum & Bernstein, P.L.C.

(57) ABSTRACT

A connector main body of a connector accommodates a contact unit, a power cut-off unit that has an electric conductor unit, and open and close a power feeding path between an electrically driven vehicle and an electric power apparatus by bringing into contact or opening electric conductor unit, and an abnormality detection unit that detects an abnormality that occurs on power feeding path, or receives an abnormality signal from outside, an abnormality transmission unit that, when abnormality detection unit detects abnormality or receives abnormality signal, mechanically opens electric conductor unit, and a handle that mechanically brings into contact or opens electric conductor unit in a state in which abnormality detection unit does not detect abnormality and does not receive abnormality signal. Abnormality detection unit detects at least one of a short-circuit current and an overload current that occur on power feeding path as abnormality.

15 Claims, 8 Drawing Sheets

CONNECTOR

BACKGROUND OF THE INVENTION

1. Field of the Invention

This invention relates to a connector.

2. Description of the Relented Art

Conventionally, a charging cable is provided to charge a battery that is mounted on an electrically driven vehicle such as an electric vehicle (EV) and a plug-in hybrid electric vehicle (PHEV) (see JP 2010-110055A, for example). This charging cable includes a power supply plug that detachably connects to an electrical outlet of a commercial power supply, and a vehicle connector that detachably connects to the electrically driven vehicle and supplies a charging current to the battery of the electrically driven vehicle, and the power supply plug and the vehicle connector are connected by an electrical cable. Moreover, a control box is provided partway along the electrical cable, and inside the control box, an open-close circuit that opens and closes an electric path between the power supply plug and the vehicle connector and a control circuit that stops supply of the commercial power supply by opening the electric path through the open-close circuit when an abnormality is detected during charging are accommodated.

With this charging cable, the battery is charged by the electric power supplied from the commercial power supply, by connecting the power supply plug to the electrical outlet and connecting the vehicle connector to the electrically driven vehicle. Moreover, with this charging cable, if an abnormality occurs (such as a temperature increase of the power supply plug, or an electric leakage, for example) during battery charging, the control circuit detects the abnormality and opens the electric path through the open-close circuit and stops charging of the battery. Accordingly, circuit protection can be provided when an abnormality occurs.

However, with the charging cable of JP 2010-110055A described above, since the control box is provided in the middle of the electric cable, the control box can hamper storage of the electric cable. Note that, although a charging cable that does not include a control box has been conventionally provided, this charging cable does not include the function of detecting abnormalities that occur on an electric path, and in order to include the function to detect abnormality, the control box needs to be provided in the middle of the electric cable.

Moreover, a conventional control apparatus functions to stop supply of the commercial power supply, and does not have a protection function against electric power originating from an electric storage device (EV) when an abnormality occurs in the wiring between the connector with the electric storage device and the control box. If a short-circuit abnormality occurs in the above region, there is no protection against the short-circuit current caused by electric power of the electrically driven vehicle (electric storage device), and if an electric leakage abnormality occurs in the above region, protection is not available against the electric leakage of electric power from the electrically driven vehicle (electric storage device), even though the connection is open in the control box.

SUMMARY OF THE INVENTION

The present invention has been made in view of the above-described problems, and an object of the present invention is to provide a connector that improves electrical safety along with improving usability.

A connector (connector for electric connection) of the present invention electrically connects between a device to be charged that has an electrical storage unit and an electric power apparatus that controls at least one of an electric power supply to the device to be charged and an electric power supply from the device to be charged. The connector includes a contact unit configured to electrically connect an electric cable that is electrically connected to one of the device to be charged and the electric power apparatus to the other of the device to be charged and the electric power apparatus that is not connected to the electric cable, and a connector main body. The connector main body accommodates the contact unit, a power cut-off unit configured to have an electric conductor unit that is serially connected to the electric cable, and open and close a power feeding path between the device to be charged and the electric power apparatus by bringing into contact or opening the electric conductor unit, and a first abnormality detection unit configured to detect an abnormality that occurs on the power feeding path, or receives an abnormality signal from outside. Also, the connector main body accommodates an abnormality transmission unit configured to, when the first abnormality detection unit detects the abnormality or receives the abnormality signal, mechanically open the electric conductor unit, and an open-close mechanical unit configured to mechanically bring into contact or open the electric conductor unit in a state in which the first abnormality detection unit does not detect the abnormality and does not receive the abnormality signal. The first abnormality detection unit detects at least one of a short-circuit current and an overload current that occur on the power feeding path as the abnormality.

In the connector, it is preferable that the open-close mechanical unit, when connecting the contact unit to the device to be charged or the electric power apparatus, brings the electric conductor unit into contact after the contact unit is connected, and when disconnecting the contact unit from the device to be charged or the electric power apparatus, opens the electric conductor unit before the contact unit is disconnected.

Moreover, in the connector, it is preferable that the first abnormality detection unit further detects at least one of a ground fault current, a leakage current, a contact failure with the contact unit and a temperature abnormality of the contact unit that occur on the power feeding path as the abnormality.

Furthermore, it is preferable that the connector includes a signal receiving unit configured to receive an abnormality signal that is output from a second abnormality detection unit provided outside the connector main body, and the abnormality transmission unit opens the electric conductor unit, when the signal receiving unit receives the abnormality signal.

Moreover, in the connector, it is preferable that the electric conductor unit is configured by a fixed contact maker and a movable contact maker that freely contacts with and separates from the fixed contact maker, and is accommodated in a first case made of an insulating material, the power cut-off unit has permanent magnets of which an N pole of one magnet and an S pole of the other magnet are arranged opposite each other so as to sandwich an arc that is generated when the movable contact maker separates from the fixed contact maker, and a yoke that is magnetically connected to the permanent magnets and forms a magnetic path together with the permanent magnets, the yoke is arranged outside the first case, and the permanent magnets are arranged outside the first case at a position corresponding to the fixed contact maker and the movable contact maker.

Furthermore, in the connector, it is preferable that the first case is configured by a second case that accommodates at least the power cut-off unit, the first abnormality detection unit, the abnormality transmission unit and the open-close mechanical unit.

Moreover, in the connector, it is preferable that the permanent magnets are arranged in proximity to the fixed contact maker, and rotates according to the movement of the open-close mechanical unit so as to change the direction of a magnetic field.

Furthermore, in the connector, it is preferable that the power cut-off unit includes an arc extinguishing unit that is configured by an arc running plate to transfer an arc that is generated when the movable contact maker separates from the fixed contact maker, and an arc extinguishing grid plate that extinguishes the arc that has arrived through the arc running plate.

Since a connector main body that includes a contact unit, a power cut-off unit, a first abnormality detection unit, an abnormality transmission unit, and an open-close mechanical unit is provided at an end portion of an electric cable and nothing is provided partway along the electric cable, the electric cable can be stored easily when being stored, and a connector with improved usability can be provided.

Moreover, even if an abnormality occurs in a wiring between the connector with the electric storage device (EV) and the control box, a protection function against electric power originating from the electric storage device can be provided. If a short-circuit abnormality occurs in the above region, the protection function works against the short-circuit current caused by electric power of the electrically driven vehicle (electric storage device), and if an electric leakage abnormality occurs in the above region, protection becomes available against the electric leakage of electric power from the electrically driven vehicle (electric storage device).

BRIEF DESCRIPTION OF THE DRAWINGS

Preferred embodiments of the invention will now be described in further details. Other features and advantages of the present invention will become better understood with regard to the following detailed description and accompanying drawings where.

DETAILED DESCRIPTION OF EXEMPLARY EMBODIMENTS

Figure 1A:
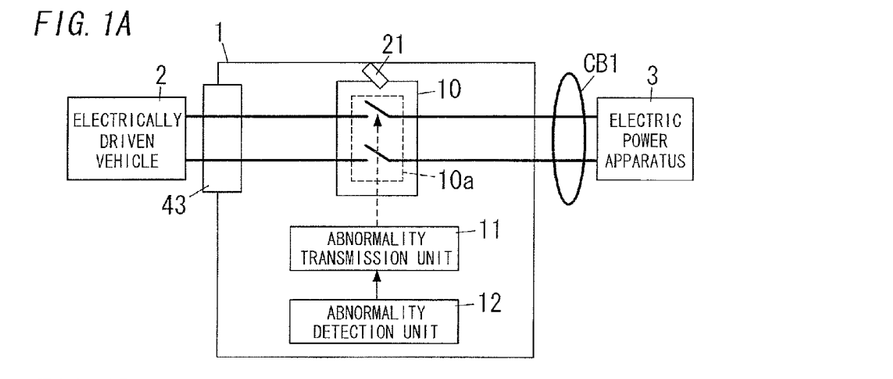
FIG. 1A is a schematic block diagram illustrating one example of a connector of the present embodiment.

In the following, an embodiment of a connector 1 will be described, with reference to FIGS. 1 to 8. The connector 1 of the present embodiment, as shown in FIG. 1A for example, electrically connects between an electrically driven vehicle 2 (device to be charged) and an electric power apparatus 3, and is used for supplying electric power from the electric power apparatus 3 to the electrically driven vehicle 2, and supplying electric power from the electrically driven vehicle 2 to the electric power apparatus 3. Note that in the following description, unless specifically noted, the a-b direction in FIG. 3 is defined as the front-back direction, the c-d direction as the vertical direction, and the e-f direction as the horizontal direction.

As the electrically driven vehicle 2, there are an electric vehicle (EV) that includes only an electric motor as a power source, and a plug-in hybrid car (PHEV) that uses an engine and an electric motor concurrently as a power source, and on both vehicles a storage battery (not shown) is mounted.

The electric power apparatus 3, is a DC/AC electric power conversion apparatus, for example, converts AC electric power supplied by a commercial power supply to DC electric power, and supplies the DC electric power to the storage battery of the electrically driven vehicle 2.

Figure 2:
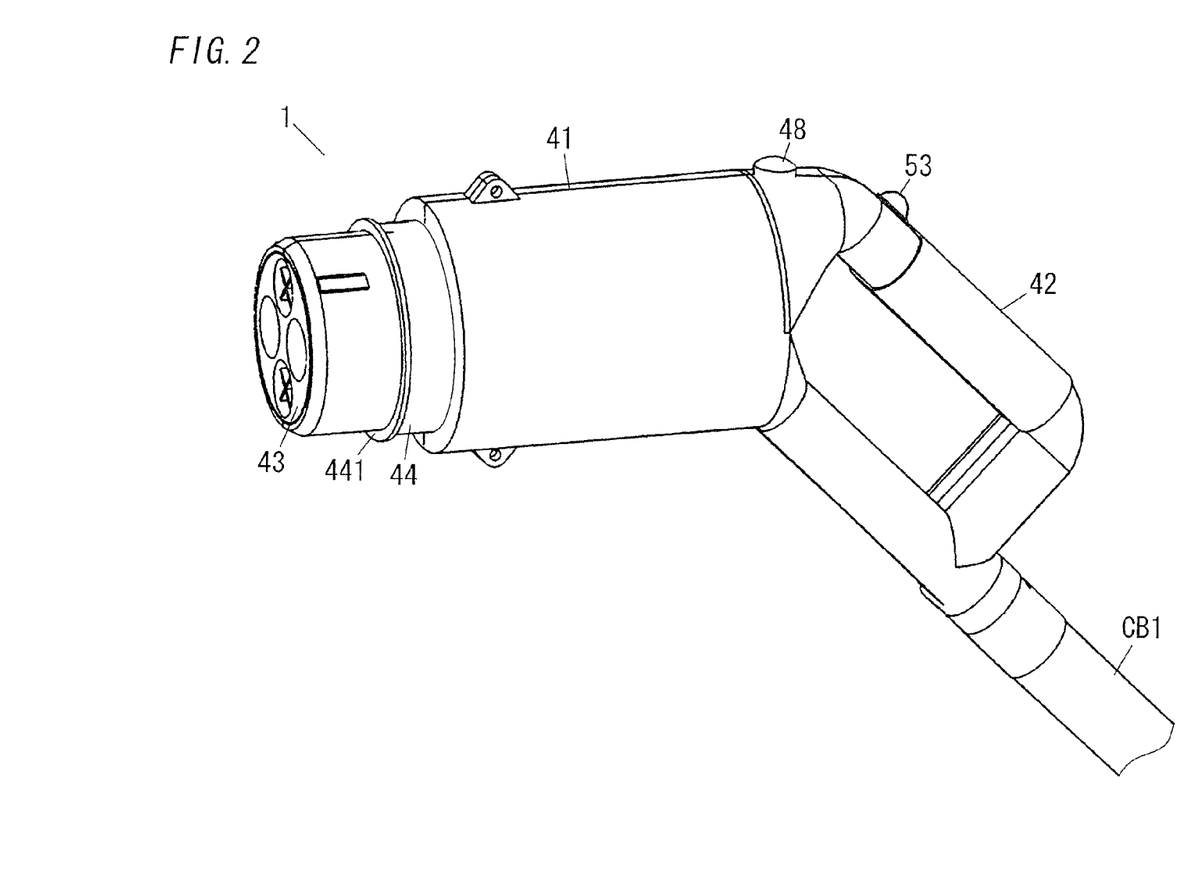
FIG. 2 is an exterior perspective view of a connector of the present embodiment.
Figure 3:
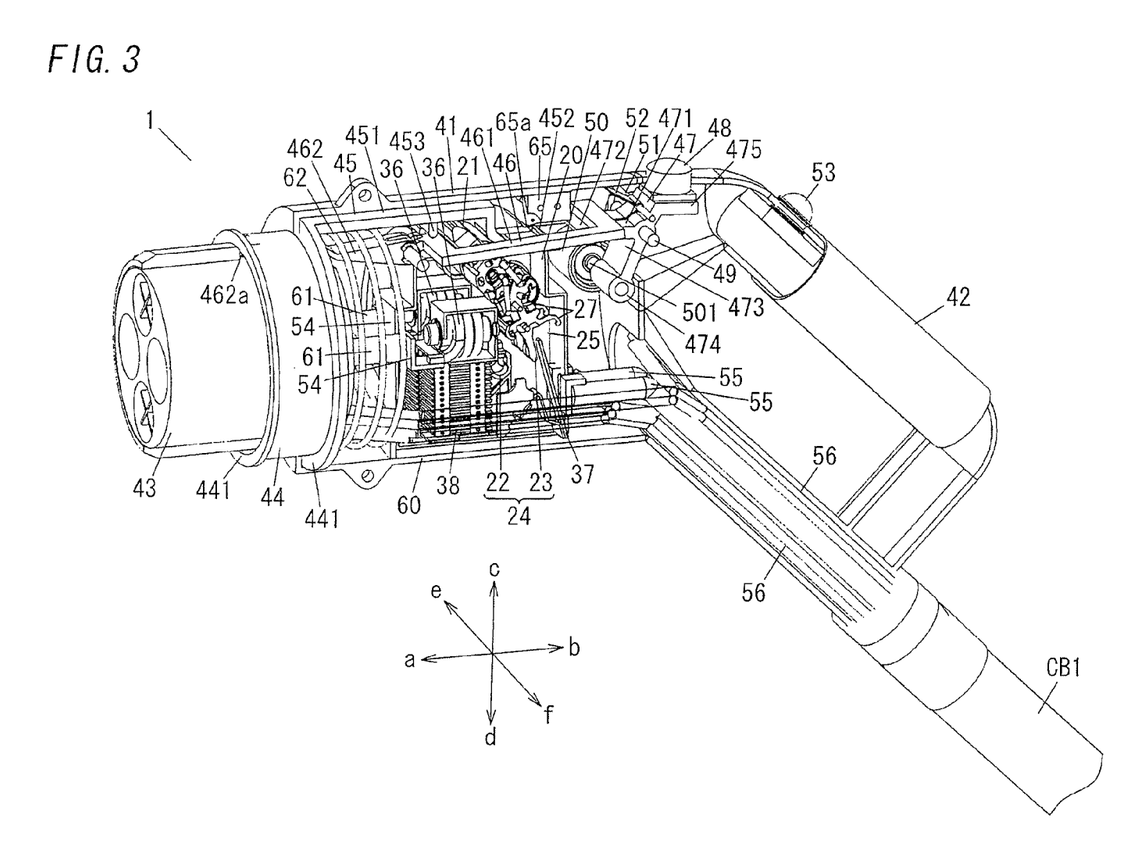
FIG. 3 is a perspective view illustrating an internal structure of a connector of the present embodiment.

FIG. 2 is an exterior perspective view of the connector 1, which is designed to be a size that an operator can hold in his/her hand and connect to a connector of the electric vehicle (EV).

FIG. 1A is a schematic block diagram illustrating an example of the connector 1 of the present embodiment. The connector 1 includes a contact unit 43, a power cut-off unit 10, an abnormality transmission unit 11, an abnormality detection unit 12, and a handle 21, and each of these units are accommodated in a connector main body 41 (see FIG. 2). The connector 1 and the electric power apparatus 3 are electrically connected by an electric cable CB1.

The contact unit 43 is connected to a vehicle-side inlet (not shown) provided in the electrically driven vehicle 2 so as to be freely insertable and removable, and by connecting the contact unit 43 to the vehicle-side inlet, the electrically driven vehicle 2 and the electric power apparatus 3 are electrically connected.

The power cut-off unit 10 has two electric conductor units 10a that are serially connected to the electric cable CB1, and opens and closes a power feeding path between the electrically driven vehicle 2 and the electric power apparatus 3, by bringing into contact or opening the electric conductor unit 10a.

The abnormality detection unit 12 detects an abnormality (for example, a short-circuit current, an overload current, or the like) that has occurred on the power feeding path between the electrically driven vehicle 2 and the electric power apparatus 3. Here, in the present embodiment, a first abnormality detection unit is configured by the abnormality detection unit 12.

The abnormality transmission unit 11 has a function to mechanically opens the electric conductor unit 10a in the power cut-off unit 10, and when the abnormality detection unit 12 detects the abnormality, it mechanically opens the electric conductor unit 10a and opens the power feeding path. As a result, power feeding from the electric power apparatus 3 to the electrically driven vehicle 2 stops.

The handle 21 has a function of mechanically bringing into contact and opening the electric conductor unit 10a in the power cut-off unit 10, and in a state in which the abnormality detection unit 12 does not detect the abnormality, opens and closes the power feeding path by mechanically brings into contact and opens the electric conductor unit 10a.

FIG. 3 is a perspective view illustrating an internal structure of the connector 1 of the present embodiment. The connector 1 includes a slide lever 45, a lock lever 46, a release lever 47, a solenoid apparatus 50, a contact mechanism unit 60, and a microswitch 65, which are accommodated in a connector main body 41 that is formed in a cylindrical shape. At a rear end portion of the connector main body 41, the handle 42 that is formed in a U-shape is integrally provided, and from a rear end portion of the handle 42, the electric cable CB1 is led out. Note that this electric cable CB1 is configured by a first cable 55 for supplying electric power and a second cable 56 for signal transmission. Moreover, an LED lamp 53 is provided at the handle 42, and lock display or abnormality display is performed by the LED lamp 53.

The slide lever 45 has a lever main body 451 that is formed in a rectangular plate shape elongated in the front and rear direction, and at a rear end portion of the lever main body 451 is provided an engaging protrusion 452. Moreover, at the middle of the lever main body 451 is provided a flange 453 that protrudes downward. The slide lever 45 is provided integrally at a rear end portion of a tube body 44 in which flange portions 441 are provided at both end portions thereof in the front-back direction. Due to the tube body 44 sliding in the front-back direction relative to the connector main body 41, the slide lever 45 slides in the front-back direction. Here, the tube body 44 has a forward elastic force applied thereto by the spring force of a return spring 62, and in a state in which the connector 1 is not connected to the vehicle-side inlet, the flange portion 441 at the rear side is in a state being brought into contact with the front face of the connector main body 41 from inside.

The lock lever 46 is to lock the connector 1 to the vehicle-side inlet (not shown) provided in the electrically driven vehicle 2. The lock lever 46 is configured by a first member 461 that is formed in a U-shape elongated in the front-back direction and a bar-shaped second member 462 that is attached to a tip portion (front end portion) of the first member 461. At the tip portion of the second member 462 is provided an engaging protrusion 462a. Moreover, the second member 462 has an upward elastic force applied thereto by a torsion spring, and when the tube body 44 moves rearward, the engaging protrusion 462a moves upward by the elastic force. Furthermore, when a release button 48 is pressed, the release lever 47 moves upward, a rear portion of the first member 461 is pushed upward, and as a result the second member 462 is pushed downward. Using the lock lever 46, the connector 1 is locked to the vehicle-side inlet, by engaging the engaging protrusion 462a of the second member 462 with an engaging groove (not shown) provided in the vehicle-side inlet.

The release lever 47 has a lever main body 471 that is formed in a rectangular plate shape elongated in the front-back direction, and at a tip portion (front end portion) of the lever main body 471 is provided an engaging protrusion 472. Moreover, at a rear end portion of the lever main body 471 is provided a support plate 475, and to the upper face of the support plate 475 is attached a round shaped release button 48. Furthermore, at the lower face of the lever main body 471 is provided an extension plate 473 that inclines obliquely downward, and at a tip portion of the extension plate 473 is provided a tube portion 474. The release lever 47 is turnably supported by a shaft portion 49 attached to the connector main body 41, and also has a downward elastic force applied thereto by a spring force of a biasing spring 52 that is fixed to a shaft portion 51 attached to the connector main body 41. Therefore, when the release lever 47 is operated, the release button 48 is pressed downward against the spring force of the biasing spring 52, and by removing a hand from the release button 48, the release lever 47 and the release button 48 are returned to the original position by the spring force of the biasing spring 52.

The solenoid apparatus 50 has a pin 501 that protrudes and retracts in the horizontal direction, and in a state in which the pin 501 is extended, the pin 501 is inserted in a tube of the tube portion 474 of the release lever 47, and as a result the release lever 47 cannot be operated. This is to prevent the connector 1 from detaching from the vehicle-side inlet even if the release button 48 is pressed accidentally while charging the electrically driven vehicle 2, for example.

The microswitch 65 has a bar-shaped lever switch 65a for turning on and off a contact (not shown) provided inside, and according to a pressing force applied to the lever switch 65a from the slide lever 45, the contact is switched on and off. Specifically, in a state in which the connector 1 is not connected to the vehicle-side inlet, the contact is off, since the pressing force is not applied to the lever switch 65a from the slide lever 45. When the connector 1 is connected to the vehicle-side inlet, the pressing force is applied to the lever switch 65a from the slide lever 45, and the contact is turned on. The contact signal by this microswitch 65 is configured to be output to the solenoid apparatus 50, and when the contact of the microswitch 65 is turned on, the solenoid apparatus 50 is driven and the pin 501 is placed in an extended state.

Figure 4A:
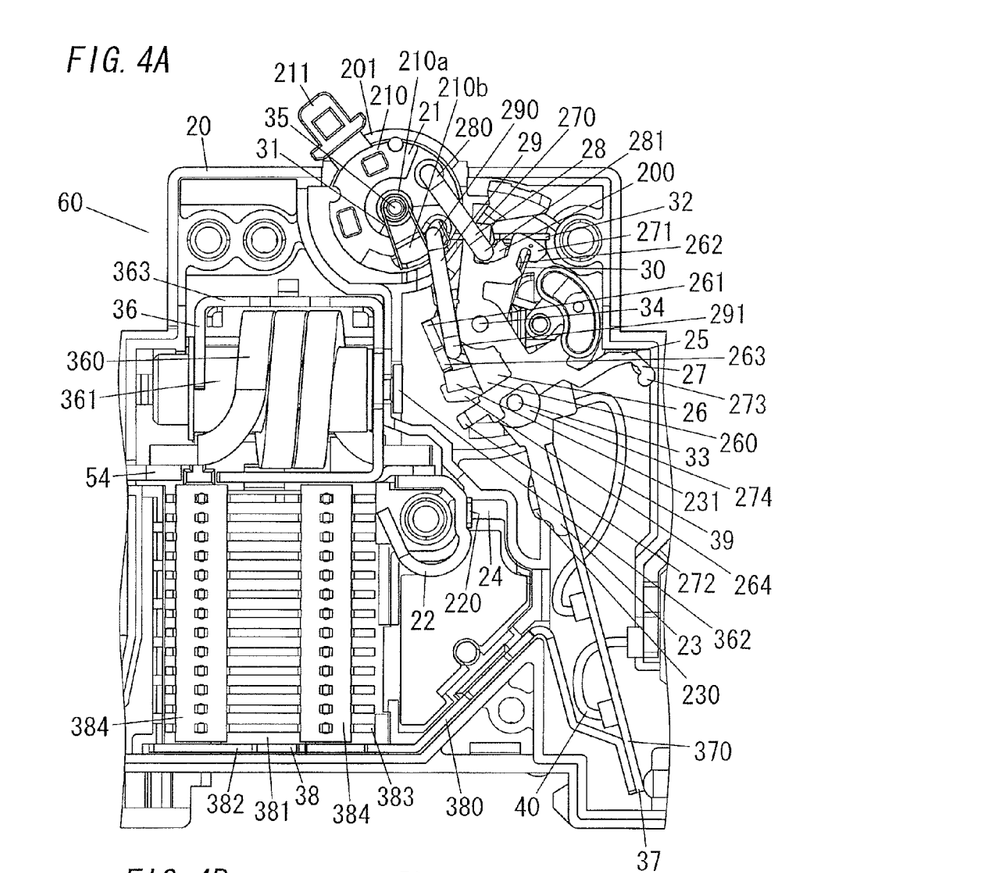
FIG. 4A is a front view illustrating an internal structure of a contact mechanism unit used for a connector of the present embodiment.

The contact mechanism unit 60 includes, as shown in FIG. 4A, a contact mechanism 24 that has a fixed contact 220 and a movable contact 230, and a link mechanism 25 that has a handle 21. The handle 21 is provided with an operation knob 211. The link mechanism 25 turns on and off the electrical connection between the fixed contact 220 and the movable contact 230 through the handle 21. Moreover, the contact mechanism unit 60 includes a trip mechanism (electromagnetic releasing unit 36 and thermally activated releasing unit 37) that forcefully opens the contact when it detects an abnormal current (short-circuit current and overload current) between the fixed contact 220 and the movable contact 230 by causing the link mechanism 25 to trip, and an arc extinguishing apparatus 38 that is for promptly extinguishing an arc generated at the opening of the contact. These units are accommodated in a housing 20 that is formed in a rectangular box shape.

The contact mechanism 24 includes a fixed contact plate 22 that is provided with the fixed contact 220, and a movable bar 23 that is provided with the movable contact 230, and the fixed contact plate 22 and the movable bar 23 are formed by performing a punching process and a bending process on a metal plate with a predetermined thickness.

The movable bar 23 is T-shaped, and the movable contact 230 is provided at a lower portion. Moreover, at the right side of an upper portion of the movable bar 23, a spring bearing piece (not shown) is provided, and at the left side of an upper portion is provided a stopper piece 231. Furthermore, in the middle of the movable bar 23 in a longitudinal direction (vertical direction), one end of a braided wire 39 is fixed. The movable bar 23, due to working together with the link mechanism 25, moves between the position in which the movable contact 230 is brought into contact with the fixed contact 220 and the position in which the movable contact 230 separates from the fixed contact 220. Here in the present embodiment, a fixed contact maker is configured by the fixed contact 220, and a movable contact maker is configured by the movable contact 230. Similarly, in the present embodiment, an electric conductor unit 10a is configured by the fixed contact 220 and the movable contact 230, and a power cut-off unit 10 is configured by the fixed contact plate 22 and the movable bar 23.

The link mechanism 25 includes the handle 21, a support arm 26, a latch member 27, a first link 28, a second link 29, a latch spring 30, a link spring 31, a handle spring 32, a pressing spring (not shown), a first turning shaft 33, and a second turning shaft 34.

The handle 21 is configured by a main body portion 210 that is formed in a substantially columnar shape by a synthetic resin, and an operation knob 211 that has a substantially rectangular parallelepiped shape and is formed on an outer circumferential face of the main body portion 210. In the main body portion 210, a shaft hole 210a is formed along its central axis, and furthermore in one side face (front face in FIG. 4A) of the main body portion 210, a oblong hole-shaped guide groove 210b is formed along the circumferential direction. The handle 21 is turnably supported by a handle shaft 35 attached to the housing 20, in a state in which the operation knob 211 is exposed from an operation opening 201 of the housing 20. The operation knob 211 turns between an open position in which the contact mechanism 24 is opened and a close position in which the contact mechanism 24 is closed.

The support arm 26 and the latch member 27 are formed by a punching process and a bending process performed on a metal plate with a predetermined thickness. The first link 28 and the second link 29 are formed in a substantially U-shape by bending both ends of a round bar-shaped metal bar in one direction respectively. The latch spring 30, the link spring 31, the handle spring 32, and the pressing spring are formed by a torsion coil spring in which both end portions protrude in the opposite direction to each other. The first turning shaft 33 and the second turning shaft 34 are respectively formed by a round bar-shaped metal bar.

The support arm 26 has a pair of side plates 260 (only near side is shown in FIG. 4A) that are arranged side by side in the horizontal direction (direction perpendicular to the sheet in FIG. 4A), and both the side plates 260 are connected by an intermediate piece 261. Moreover, at an upper end of one of (near side) the side plates 260, an engaging protrusion 262 that is extended obliquely upward is formed, and approximately at the center of a side edge of the other (back side) side plate 260 is formed a substantially L-shaped protrusion piece 264 in which the tip protrudes upward. Furthermore, at a lower end of the intermediate piece 261 is formed an engaging piece 263 protruding downward that is opposite to the stopper piece 231 of the movable bar 23. The support arm 26, in which the first turning shaft 33 and the second turning shaft 34 are respectively inserted, is turnably supported by the second turning shaft 34 that is attached to the housing 20.

The upper portion of the movable bar 23 is inserted between the pair of side plates 260 of the support arm 26, and is turnably supported by the support arm 26 through the first turning shaft 33. And when the support arm 26 turns around the second turning shaft 34, the movable bar 23 moves along with the support arm 26.

The latch member 27 is provided with an L-shaped claw piece 270 at one side of the upper portion (left side in FIG. 4A), and is provided with an L-shaped spring bearing piece 271 at the other side of the upper portion (right side in FIG. 4A). Similarly, at an edge portion of one side of the lower portion of the latch member 27, a first pressing piece 272 extends, and at the other side of the lower portion, a substantially L-shaped second pressing piece 273 extends. The latch member 27, in which the second turning shaft 34 is inserted approximately at the center, is turnably axially supported around the second turning shaft 34. Moreover, at a lower end portion of the latch member 27, a substantially rectangular shaped notch portion 274 is formed, and the first turning shaft 33 engages with the notch portion 274.

In the first link 28, an upper leg portion 280 is turnably axially supported by a shaft hole (not shown) provided in the handle 21, and a lower leg portion 281 engages and disengages with an engaging portion 200 that is configured by a claw piece 270 of the latch member 27 and an engaging protrusion 262 of the support arm 26. In the second link 29, an upper leg portion 290 is engageably inserted in the guide groove 210b of the handle 21 and a lower leg portion 291 is hooked and locked to an engaging piece 263 of the support arm 26.

The latch spring 30, in which the second turning shaft 34 is inserted into a wound portion, and one end thereof is locked to a spring bearing piece 271 of the latch member 27, applies a right-hand (clockwise rotation in FIG. 4A) elastic force to the latch member 27. The link spring 31, in which a handle shaft 35 is inserted into the wound portion, one end portion comes into contact with the handle 21, and the other end portion comes into contact with the upper leg portion 290 of the second link 29, applies an rightward elastic force to the second link 29.

The electromagnetic releasing unit 36 serving as a trip mechanism is configured by a coil 360 made of a rectangular winding wire, a coil bobbin 361, a stationary core and a movable core that are made of a magnetic material (both of which are not shown), a return spring (not shown), a pressing pin 362 that is connected to the movable core, and a yoke 363. At one end of the coil 360 is fixed the fixed contact plate 22, and at the other end of the coil 360 is fixed the terminal plate 54. The yoke 363 is made of a magnetic material and is formed in a hollow rectangular frame shape with a notch, and the coil bobbin 361 is arranged to be surrounded by the yoke 363. At a rear end portion (right end portion in FIG. 4A) of the yoke 363, an insertion hole (not shown) in which the pressing pin 362 is inserted is provided. In the electromagnetic releasing unit 36, in a state in which current does not flow in the coil 360, the movable core separates from the stationary core by a spring force of the return spring, and the pressing pin 362 connected to the movable core is in a pulled-in state as shown in FIG. 4A. When an excessive current flows in this state in the coil 360 such as a short-circuit current or the like, the movable core moves toward the stationary core against the spring force of the return spring, and the pressing pin 362 connected to the movable core protrudes rearward (right direction in FIG. 4A). The tip portion of the pressing pin 362 then presses the first pressing piece 272 of the latch member 27 rearward, the movable bar 23 moves rearward along with the latch member 27, and as a result the movable contact 230 separates from the fixed contact 220. As a result, the power feeding path from the electric power apparatus 3 to the electrically driven vehicle 2 is cut off and the power supply to the electrically driven vehicle 2 stops.

The thermally activated releasing unit 37 serving as another trip mechanism is configured by a band plate-shaped bimetal plate 370, as shown in FIG. 4A. As the bimetal plate 370, a directly heated type bimetal plate which bends by self-heating, or an indirectly heated type bimetal plate which bends by heat applied by a layered plate-shaped heater can be used. At an intermediate position of the bimetal plate 370 is fixed one end of the braided wire 39 of which the other end is fixed to the movable bar 23. Moreover, to a lower portion of the bimetal plate 370 one end of the braided wire 40 is fixed.

The bi-metal plate 370 does not bend in a normal state, and when an excessive current such as an overload current flows, the temperature of the bi-metal plate 370 increases by the overload current, and as a result the bimetal plate 370 bends. When the bimetal plate 370 bends, the tip portion (upper end portion) presses the second pressing piece 273 of the latch member 27 rearward (right side in FIG. 4A), and since the movable bar 23 moves rearward along with the latch member 27, the movable contact 230 separates from the fixed contact 220. As a result, the power feeding path from the electric power apparatus 3 to the electrically driven vehicle 2 is cut off and the power supply to the electrically driven vehicle 2 stops. In the present embodiment, the abnormality transmission unit 11 and the abnormality detection unit 12 are configured by the electromagnetic releasing unit 36 and the thermally activated releasing unit 37.

The arc extinguishing apparatus 38 is, as shown in FIG. 4A, configured by an arc running plate 380 and an arc extinguishing grid 381. The arc running plate 380 is formed by a bending process of a band plate-shaped metal plate, a base portion of the bi-metal plate 370 is connected to one end, and the arc extinguishing piece 382 is provided at the other end. The arc extinguishing grid 381 is configured by an arc extinguishing plate 383 that is formed by a plurality of conductive plates that are arranged parallely in the vertical direction at predetermined intervals, and two support plates 384 that are formed by an insulating material. Both the support plates 384 cover both faces of each arc extinguishing plate 383 in the width direction and hold the arc extinguishing plates 383 at a predetermined interval from each other. The arc extinguishing grid 381 is arranged between the arc extinguishing piece 382 and the lower side of the yoke 363. Here, in the present embodiment, the arc extinguishing unit is configured by the arc extinguishing apparatus 38.

Next, an operation of the contact mechanism unit 60 will be described. FIG. 4A shows a state in which the contact mechanism 24 is open, and when the main body portion 210 of the handle 21 is rotated clockwise in this state, the engaging protrusion 262 of the support arm 26 is pressed to the right by the lower leg portion 281 of the first link 28. Accordingly, the support arm 26 rotates clockwise around the second turning shaft 34. At this time, the movable bar 23 that is axially supported by the first turning shaft 33 moves to the left along with the support arm 26. Here, when the upper leg portion 290 of the second link 29 is on the right side of the line segment that connects the lower leg portion 291 and the handle shaft 35, the upper leg portion 290 moves downward by the rotation of the handle 21. At this time, the lower leg portion 291 of the second link 29 presses the stopper piece 231 of the movable bar 23 downward. In other words, the movable bar 23 is pressed counterclockwise by the lower leg portion 291 of the second link 29, while receiving a clockwise elastic force by the pressing spring (not shown) around the first turning shaft 33. When the handle 21 is rotated clockwise further from this state, the upper leg portion 290 of the second link 29 moves to the left side of the line segment that connects the lower leg portion 291 and the handle shaft 35, and the second link 29 is pulled upward. At this time, the lower leg portion 291 of the second link 29 moves upward, the pressing force to the stopper piece 231 of the movable bar 23 is removed, the movable bar 23 rotates clockwise rapidly by the spring force of the pressing spring around the first turning shaft 33, and the movable contact 230 comes into contact with the fixed contact 220 vigorously. Accordingly, since the movable contact 230 comes into contact with the fixed contact 220 in a short time, the generation of an arc can be suppressed. Similarly, the latch member 27 rotates clockwise by the spring force of the latch spring 30.

In a state in which the contact mechanism 24 is closed, when the main body portion 210 of the handle 21 is rotated counterclockwise, the lower leg portion 281 of the first link 28 is pulled upward. Accordingly, the force with which the first link 28 presses the support arm 26 is removed. And the movable bar 23 rotates clockwise by the spring force of the pressing spring around the first turning shaft 33, and the support arm 26 rotates counterclockwise by the spring force of the pressing spring around the second turning shaft 34. The support arm 26 stops at the position in which the first turning shaft 33 moves to the rear end position (right end position in FIG. 4A) of a guide rib (not shown), and the movable bar 23 stops at the position in which the stopper piece 231 comes into contact with the engaging piece 263 of the support arm 26. The movable contact 230 then separates from the fixed contact 220. Here, the handle 21 is biased toward the open position (counterclockwise) by the handle spring 32, and when the upper leg portion 280 of the first link 28 passes the line segment that connects the handle shaft 35 and the lower leg portion 281 of the first link 28 from the left to the right, the handle 21 rotates rapidly toward the open position. Accordingly, the movable contact 230 is separated from the fixed contact 220 rapidly, and the generation of an arc can be suppressed. Also, the latch member 27 rotates counterclockwise around the second turning shaft 34 due to being pulled by the lower leg portion 281 of the first link 28.

Figure 4B:
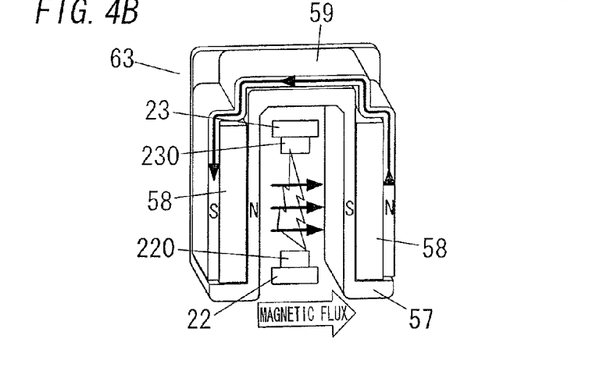
FIG. 4B is a overall perspective view illustrating one example of a DC arc extinguishing apparatus used for the contact mechanism unit.

Incidentally, when the electric power that is supplied from the electric power apparatus 3 to the electrically driven vehicle 2 is DC electric power, there are cases in which an arc cannot be guided to the arc extinguishing grid due to an arc drive force being insufficient in the small current region, and in this case, the arc cannot be cut off. Thus, in the present embodiment, a DC arc extinguishing apparatus 63 shown in FIG. 4B is provided so as to cut off an arc even in a small current region.

The DC arc extinguishing apparatus 63 is configured by a pair of permanent magnets 58 that are formed in a plate shape, a yoke 59 formed in a U-shape, and a case 57 (first case) inside which the fixed contact plate 22 and the movable bar 23 are arranged. The pair of permanent magnets 58 are arranged outside the case 57 so as to sandwich, in the horizontal direction, the fixed contact plate 22 and the movable bar 23 that are arranged vertically, and each permanent magnet 58 is arranged respectively in the direction in which the left side is the S pole and the right side is the N pole. The yoke 59 is arranged outside the case 57 so as to sandwich both the permanent magnets 58 from both the left and right sides. Accordingly, a magnetic path is formed by both the permanent magnets 58, and the yoke 59, and a magnetic field from the permanent magnet 58 at the left to the permanent magnet 58 at the right is formed inside the case 57, as shown in FIG. 4B. An arc generated between the movable contact 230 and the fixed contact 220 is stretched and cut-off by an electromagnetic force applied in the direction perpendicular to the paper surface in FIG. 4B. Thus, according to the DC arc extinguishing apparatus 63, even in a small current region, an arc can be stretched and cut-off by the electromagnetic force. Note that the DC arc extinguishing apparatus 63 is accommodated in the housing 20 so that the fixed contact plate 22 and the movable bar 23 are arranged inside the case 57. Here, the position corresponding to the fixed contact plate 22 and the movable bar 23 refers to the position in which the direction of the magnetic flux due to both the permanent magnets 58 is orthogonal to the moving direction of the movable contact 230 relative to the fixed contact 220 (vertical direction in FIG. 4B), as shown in FIG. 4B.

Figure 5A:
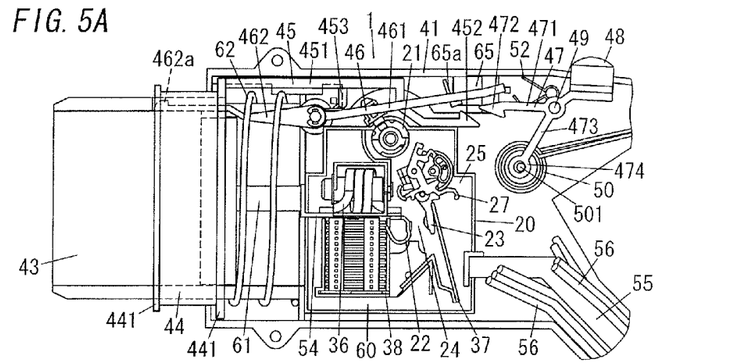
FIGS. 5A to 5C are illustrative diagrams describing a procedure for attaching a connector of the present embodiment to a device to be charged.

Next, the operation of the connector 1 will be described, with reference to FIG. 5. FIG. 5A is a state in which the connector 1 is not connected to the vehicle-side inlet (not shown) of the electrically driven vehicle 2, and at this time, since the handle 21 of the contact mechanism unit 60 is in the open position, the movable contact 230 is separated from the fixed contact 220. Similarly, at this time, since the lever switch 65a of the microswitch 65 is not pressed by the slide lever 45, the contact (not shown) is in the off state, and the pin 501 of the solenoid apparatus 50 is in a pulled-in state. Note that since the operation of the contact mechanism unit 60 has been already described, description is omitted here.

Figure 5B:
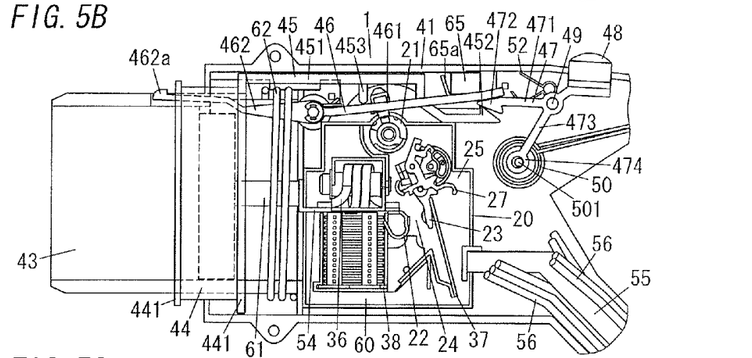

When an operator inserts the contact unit 43 to the vehicle-side inlet of the electrically driven vehicle 2, as shown in FIG. 5B, the tube body 44 is pushed rearward against the spring force of the return spring 62, and the slide lever 45 moves rearward. At this time, due to the elastic force of the torsion spring, the engaging protrusion 462a of the second member 462 is pushed upward. Also at this time, although the handle 21 is pressed rearward by the flange 453 of the slide lever 45, since the handle 21 has not moved to the close position, the movable contact 230 is still in a state in which it is separated from the fixed contact 220.

Figure 5C:
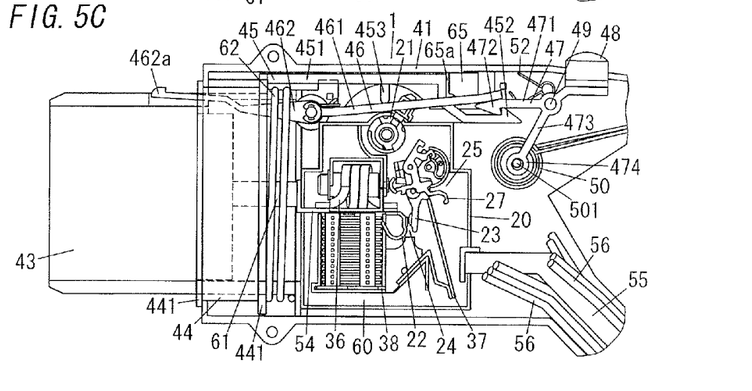

Furthermore, when the operator inserts the contact unit 43 to the predetermined position of the vehicle-side inlet, as shown in FIG. 5C, the flange portion 441 at the front side of the tube body 44 is brought into contact with the front face of the connector main body 41, and the engaging protrusion 452 of the slide lever 45 engages with the engaging protrusion 472 of the release lever 47. At this time, the handle 21 of the contact mechanism unit 60 moves to the close position by the pressing force of the flange 453, and the movable contact 230 is brought into contact with the fixed contact 220. Also at this time, the engaging protrusion 462a of the second member 462 at the lock lever 46 engages with the engaging groove (not shown) provided in the vehicle-side inlet, and the connector 1 is locked to the vehicle-side inlet. Furthermore, at this time, the lever switch 65a of the microswitch 65 is pushed rearward by the slide lever 45, and the contact of the microswitch 65 is closed. Then, due to the contact of the microswitch 65 being closed, the pin 501 of the solenoid apparatus 50 extends and is inserted in the tube of the tube portion 474 at the release lever 47, and the release lever 47 becomes inoperable.

When the charging to the electrically driven vehicle 2 is completed, a charging completion signal is output from the electrically driven vehicle 2, the solenoid apparatus 50 is driven by the charging completion signal, and the pin 501 is placed in the pulled-in state. Then, due to the operator pushing the release button 48 downward, the engaged state between the engaging protrusion 452 of the slide lever 45 and the engaging protrusion 472 of the release lever 47 is released, the second member 462 of the lock lever 46 is pushed downward, and the engagement state between the engaging protrusion 462a and the engaging groove is released. Then by pulling the connector 1 closer, the connector 1 can be detached. At this time, the tube body 44 and the slide lever 45 move forward by the spring force of the return spring 62, and the handle 21 moves to the open position by a force applied by the slide lever 45. As the result, the movable contact 230 separates from the fixed contact 220. Here, in the present embodiment, the open-close mechanical unit is configured by the handle 21, the slide lever 45, and the release lever 47.

During charging to the electrically driven vehicle 2, when an abnormality is detected by the electromagnetic releasing unit 36 or the thermally activated releasing unit 37, the movable contact 230 separates from the fixed contact 220. At this time, since the handle 21 is forcibly kept at the close position by applying an external force to the handle 21 by the slide lever 45, the upper leg portion 280 of the first link 28 does not move, and only the lower leg portion 281 moves away from the engaging portion 200. Also, the place where the lower leg portion 291 of the second link 290 is fitted has excess space, and with the second link 29, only the lower leg portion 291 moves in the space, and the upper leg portion 290 does not move. In other words, both the upper leg portion 280 of the first link 28 connected to the handle 21 and the upper leg portion 290 of the second link 29 connected to the handle 21 do not move, and the handle 21 maintains the close position. Furthermore, at this time, since the slide lever 45 does not move forward, and the contact of the microswitch 65 is in a closed state, the release lever 47 is in an inoperable state. In other words, in this state, the connector 1 cannot be detached from the electrically driven vehicle 2. Thereafter, the electrically driven vehicle 2 that detected the abnormality outputs an abnormality detection signal, the solenoid apparatus 50 is driven by the abnormality detection signal, and the pin 501 is placed in a pulled-in state. Then by the operator pushing the release button 48 downward, the engagement state between the engaging protrusion 452 of the slide lever 45 and the engaging protrusion 472 of the release lever 47 is released, and further by pulling the connector 1 closer, the connector 1 can be detached. At this time, the handle 21 moves to the predetermined open position by the force applied by the slide lever 45, and therefore the trip state caused by the abnormality is released.

Here, in the present embodiment, in order to suppress the generation of an arc in the contact unit 43, the following measures have been adopted. First, when the connector 1 is connected to the vehicle-side inlet, after a contact pin 61 of the contact unit 43 is brought into contact with a contact pin (not shown) of the vehicle-side inlet, the movable contact 230 is brought into contact with the fixed contact 220. Similarly, when the connector 1 is detached from the vehicle-side inlet, after the movable contact 230 is separated from the fixed contact 220, the contact pin 61 of the contact unit 43 is separated from the contact pin of the vehicle-side inlet. As the result, generation of an arc between the contact pin 61 of the contact unit 43 and the contact pin of the vehicle-side inlet can be suppressed.

Thus, according to the present embodiment, since the connector main body 41 that includes the contact unit 43, the power cut-off unit 10, the abnormality transmission unit 11, the abnormality detection unit 12, and the handle 21 is provided at the end portion of the electric cable CB1, and nothing is provided in the middle of the electric cable CB1, when the electric cable CB1 is stored, it is easily stored, and the connector 1 with improved usability can be provided. Similarly, according to the present embodiment, a protection function against electric power caused by the electrically driven vehicle 2 can be provided, and even when a short-circuit abnormality or an electric leakage abnormality occurs at the wiring from the connector of the electrically driven vehicle 2 to the control box, protection can be provided. Furthermore, since the power cut-off unit 10 and the abnormality detection unit 12 are provided separately, when the detection level of the short-circuit current or the overload current is changed, only the abnormality detection unit 12 needs to be replaced, and there is an advantage in that the detection level can be easily changed.

Figure 1B:
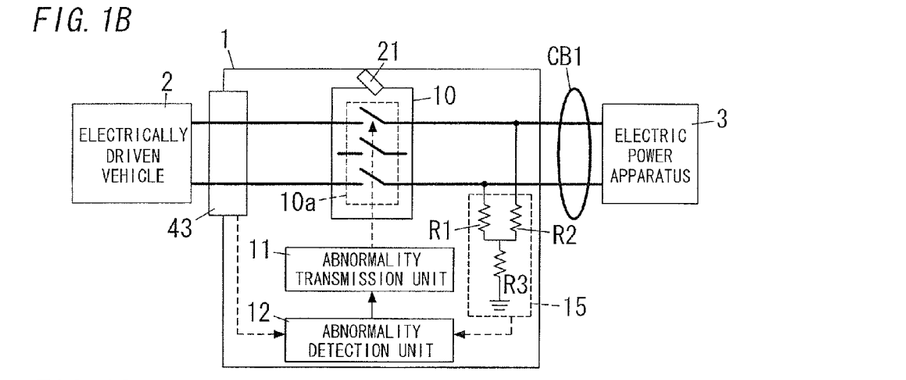
FIG. 1B is a schematic block diagram illustrating another example of a connector of the present embodiment.

FIG. 1B is a schematic block diagram illustrating another example of the connector 1 of the present embodiment. In the example shown in FIG. 1A, although a short-circuit current or an overload current flowing through the power feeding path is detected by the abnormality detection unit 12 (first abnormality detection unit), in this example, in addition, a ground fault current or a leakage current is detected by a grounding circuit 15 configured by a plurality of resistors R1 to R3, a contact failure at the contact unit 43 is detected by using a microswitch and the like, and a temperature abnormality of the contact unit 43 is detected by a temperature sensor. Accordingly, the connector 1 with improved safety can be provided compared with the connector 1 shown in FIG. 1A.

Figure 1C:
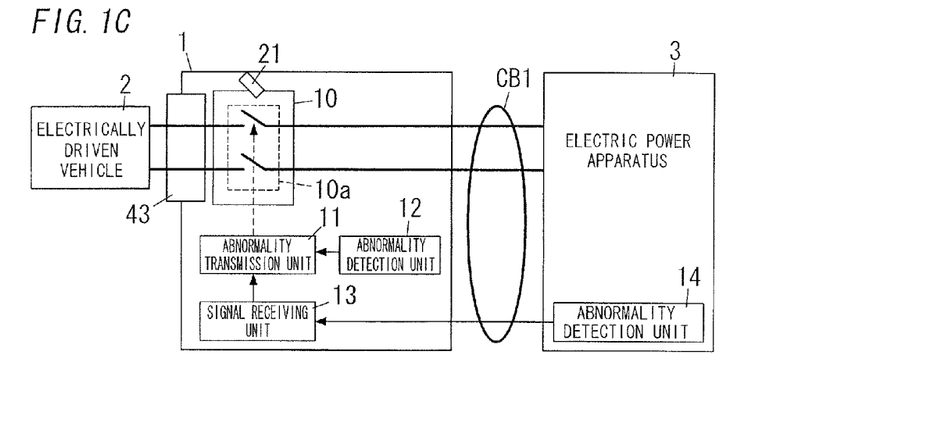
FIG. 1C is a schematic block diagram illustrating a further example of a connector of the present embodiment.

FIG. 1C is a schematic block diagram illustrating a further example of the connector 1 of the present embodiment. In this example, in the electric power apparatus 3 an abnormality detection unit 14 is provided, and a signal receiving unit 13 for receiving an abnormality signal output from the abnormality detection unit 14 is provided in the connector 1. When the signal receiving unit 13 receives the abnormality signal output from the abnormality detection unit 14, the abnormality transmission unit 11 opens the electric conductor unit 10a of the power cut-off unit 10 following the abnormality signal, and opens the power feeding path. Specifically, the abnormality detection unit 14 detects an abnormality that occurs in the electric power apparatus 3, and an abnormality that occurs on the electric path from a predetermined electric power source (not shown) that supplies electric power to the electric power apparatus 3 to the electric power apparatus 3, and outputs the abnormality signal to the signal receiving unit 13. Then when the signal receiving unit 13 receives the abnormality signal, an excessive current is intentionally caused to flow through the coil 360 or the bi-metal plate 370 and a pseudo-trip state is realized, resulting in the movable contact 230 separating from the fixed contact 220 and the power feeding path being opening. Thus, by cutting-off the power feeding path by the abnormality signal from the electric power apparatus 3 that is different from the connector 1, an abnormality can be detected over a wider range and the power feeding path can be cut-off. Here, in the present embodiment, the second abnormality detection unit is configured by the abnormality detection unit 14, and as an abnormality to be detected by the abnormality detection unit 14, not only a short-circuit current or an overload current similar to the abnormality detection unit 12, but also a ground fault current or a leakage current may be detected, and a contact failure or a temperature abnormality of the contact unit 43 may be detected.

Figure 6A:
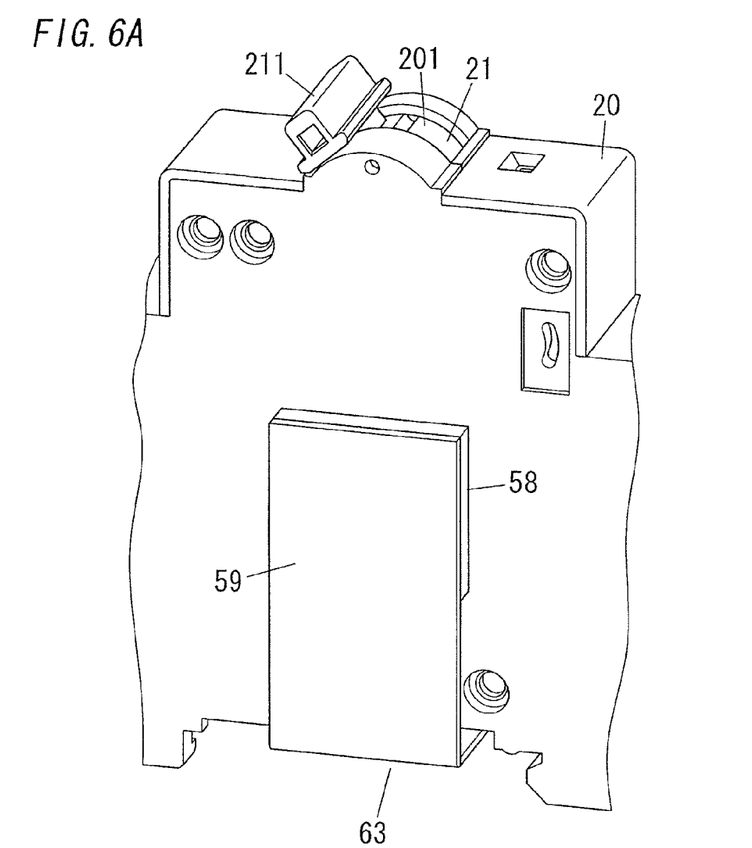
FIG. 6A is a overall perspective view of another example of the contact mechanism unit used for a connector of the present embodiment.
Figure 6B:
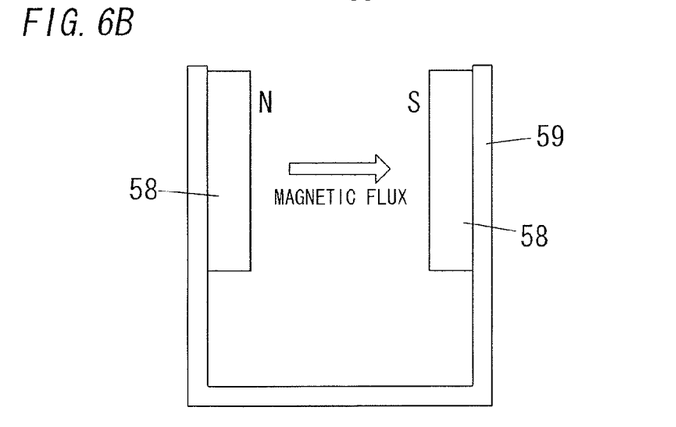
FIG. 6B is another example of the DC arc extinguishing apparatus used for the contact mechanism unit.

FIGS. 6A and 6B illustrate another example of the DC arc extinguishing apparatus 63 of the present embodiment, and instead of the case 57 (first case) described in FIG. 4B, the housing 20 is utilized. In this case, as shown in FIG. 6A, the housing 20 is inserted in the U-shaped yoke 59, and further a pair of permanent magnets 58 are arranged at the position corresponding to the fixed contact plate 22 and the movable bar 23 that are accommodated in the housing 20. Accordingly, the case 57 can be omitted, and cost down can be realized. Here in this example, the second case is configured by the housing 20, and the position corresponding to the fixed contact plate 22 and the movable bar 23 refers to the position in which the direction of the magnetic flux due to both the permanent magnets 58 is orthogonal to the moving direction of the movable contact 230 relative to the fixed contact 220.

Figure 7A:
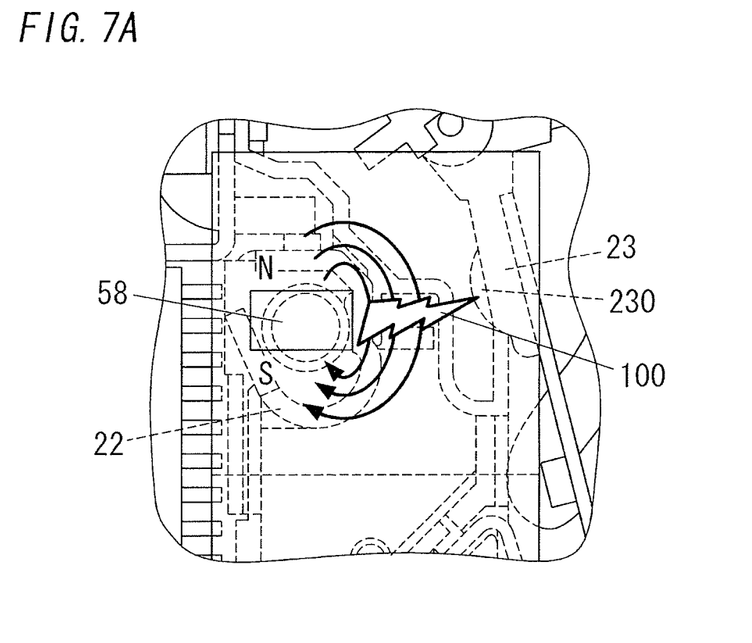
FIGS. 7A and 7B are partial enlarged diagrams of a further example of the DC arc extinguishing apparatus used in the contact mechanism unit.
Figure 7B:
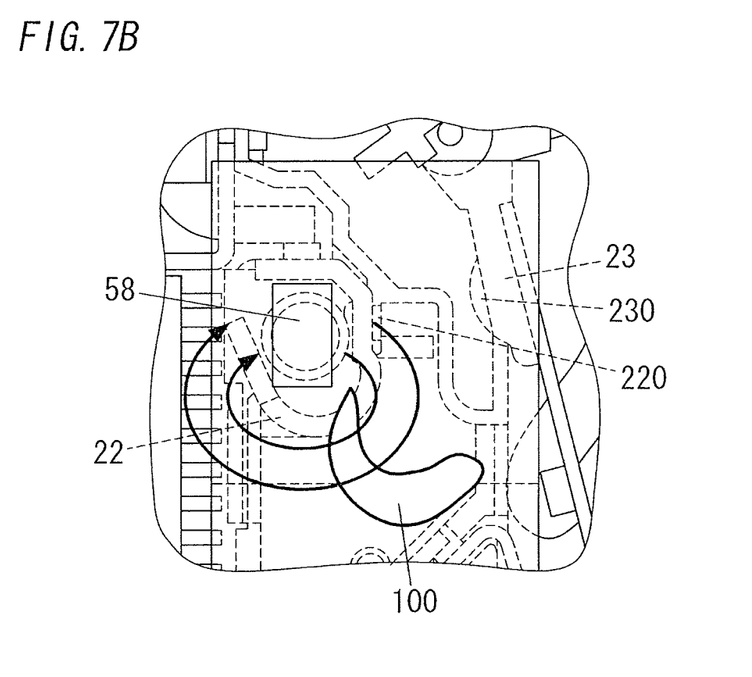

Similarly, as shown in FIGS. 7A and 7B, by rotating the permanent magnet 58 following the rotational movement of the handle 21, the direction of the magnetic field may be changed, and accordingly, even in a case where an arc drive cannot be performed by a self magnetic field due to relatively low current, an arc 100 can be stretched and cut-off by the external magnetic field.

Note that in the present embodiment, although a case in which the device to be charged is an electrically driven vehicle 2 has been described as an example, the device to be charged is not limited to the electrically driven vehicle 2, and may be any device that has an electrical storage unit (for example, a stationary storage battery, etc.). Similarly, in the present embodiment, although a case in which the electric power apparatus 3 is a DC/AC electric power conversion apparatus is described as an example, the electric power apparatus is not limited to the present embodiment, and may be an apparatus that supplies AC electric power to the electrically driven vehicle 2. In this case, however, a function to convert the AC electric power to the DC electric power needs to be provided in the electrically driven vehicle 2.

Furthermore, in the present embodiment, although a case in which the electric power apparatus 3 supplies electric power to the electrically driven vehicle 2 has been described as an example, the connector 1 may be used to supply electric power from the electrically driven vehicle 2 to the electric power apparatus 3, and also the connector 1 may be used for bi-directional electric power supply. Similarly, in the present embodiment, the connector 1 that is connected to the vehicle-side inlet of the electrically driven vehicle 2 has been described, the connector 1 may be used at a portion that is connected to the electric power apparatus 3, and is not limited to the present embodiment. Furthermore, the connector may be configured to detect the shock of an earthquake with the abnormality detection unit 12 or the abnormality detection unit 14, and when the shock is greater than or equal to a predetermined value, the charging to the electrically driven vehicle 2 is stopped. Similarly, in the present embodiment, although a case in which the abnormality detection unit 12 directly detects an abnormality that occurs on the power feeding path has been described, for example, the connector may be configured such that the abnormality detection unit 12 receives an abnormality signal from outside, and the abnormality transmission unit 11 opens the electric conductor unit 10a according to the abnormality signal received by the abnormality detection unit 12. In this case, since the signal receiving unit 13 need not be provided, cost down can be realized.

Figure 8:
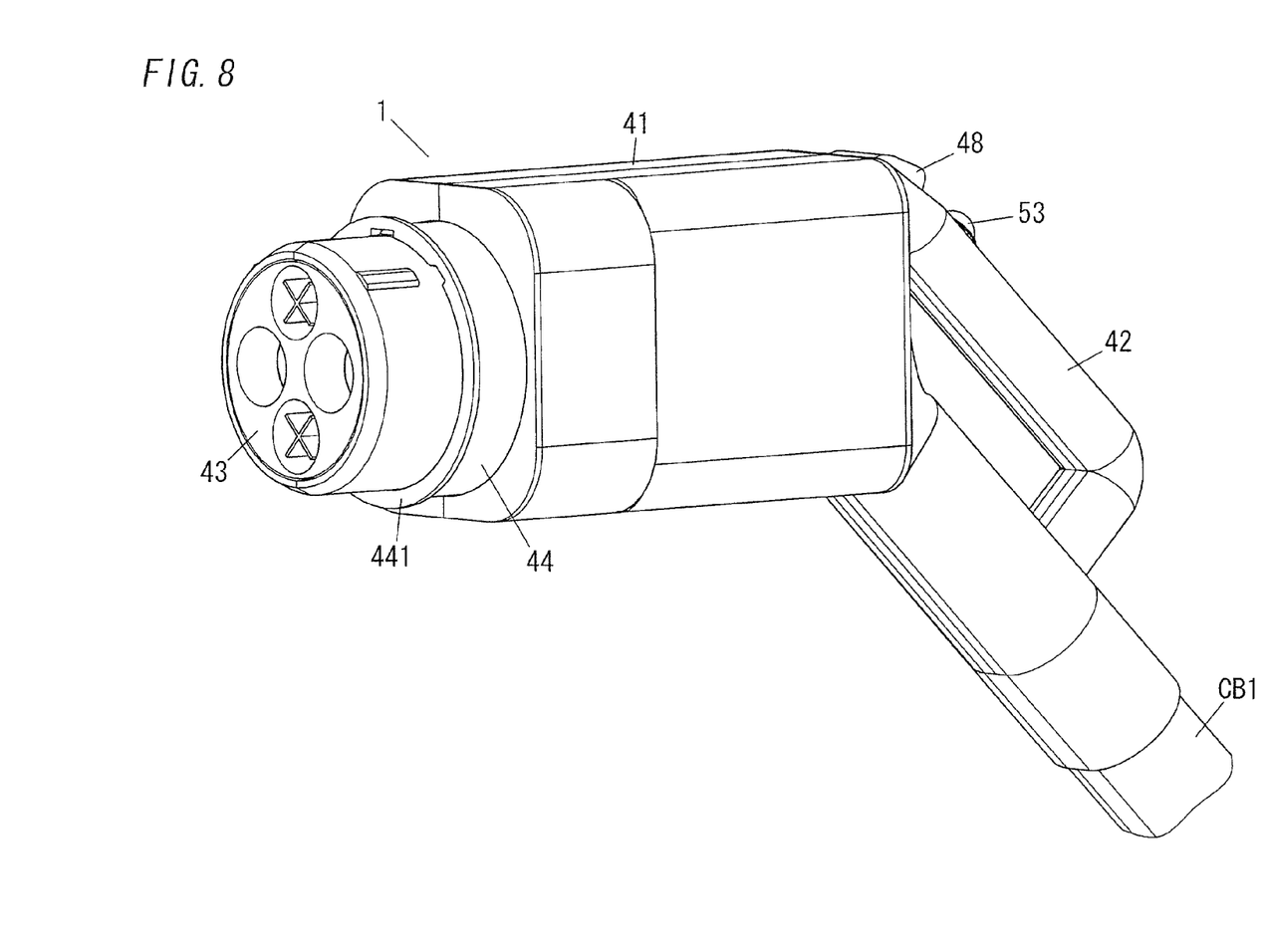
FIG. 8 is an exterior perspective view illustrating another example of a connector of the present embodiment.

Note that, in the connector 1, as shown in FIG. 8, the external form of the connector main body 41 may be formed in a substantially square tube shape. In this case, a component corresponding to the internal breaker (contact mechanism unit 60) is originally formed in a square-shape, and the appearance may be designed to meet that shape. As a result, design work load of the component corresponding to the internal breaker can be reduced, the internal space in the connector main body 41 can be used effectively, redundant space in the internal space of the connector main body 41 is not required, and it can contribute to the down sizing of the connector 1.

Here, the connector of the present embodiment is provided at one end of an electric cable that connects a device to be charged that has an electrical storage unit, and an electric power apparatus that controls at least one of supplying a charging current to the electrical storage unit and receiving a discharging current from the electrical storage unit. The connector is detachably attached at least one of a socket provided in the device to be charged and a socket provided in the electric power apparatus, and includes a connector main body that has a contact unit to be inserted into the socket at the tip, and a contact mechanism unit that is built into the connector main body. The contact unit includes a plurality of second terminals that are respectively connected to a plurality of first terminals included in the socket when inserted into the socket.

The contact mechanism unit has a contact portion that is inserted between at least one of the plurality of second terminals, and the electric cable connected to the second terminal, an open-close mechanical unit that opens and closes the contact portion, an abnormality detection unit that detects an abnormality of a current that flows through the electric cable, and an abnormality transmission unit that opens the contact portion when the abnormality detection unit detects an abnormality. The connector includes a connection mechanism unit that allows the contact unit to move between a detached position in which the contact unit is detached from the socket and an attached position in which the contact unit is attached to the socket and each first terminal is electrically connected respectively to the corresponding second terminal, a lock means to lock a connection state between the contact unit and the socket, and a releasing means that releases the locked state by the lock means so that the contact unit can be detached from the socket. The open-close mechanical unit, in coordination with the connection mechanism unit, brings the contact portion into contact after the contact unit moves from the detached position to the attached position, and, in coordination with the releasing means, opens the contact portion, when the locked state by the lock means is released.

Although the present invention has been described with reference to certain preferred embodiments, numerous modifications and variations can be made by those skilled in the art without departing from the true spirit and scope of this invention.

The invention claimed is:

1. A connector for electrically connecting between a device to be charged that has an electrical storage and an electric power apparatus that controls at least one of an electric power supply to the device to be charged and an electric power supply from the device to be charged, the connector comprising:
    a contact interface configured to electrically connect an electric cable, which is electrically connected to one of the device to be charged and the electric power apparatus, to the other of the device to be charged and the electric power apparatus that is not connected to the electric cable; and
    a connector main body,
    wherein the connector main body accommodates:
    the contact interface;
    a power disconnector configured to have an electric conductor unit that is serially connected to the electric cable, and open and close a power feeding path between the device to be charged and the electric power apparatus by bringing into contact or opening the electric conductor;
    a first abnormality detector configured to detect an abnormality that occurs on the power feeding path;
    an abnormality transmitter configured to, when the first abnormality detector detects the abnormality, mechanically open the electric conductor; and
    an open-close mechanical switch configured to move between a first position in which the electric conductor is brought into contact and a second position in which the electric conductor is opened when the first abnormality detector does not detect the abnormality, and
    the first abnormality detector detects at least one of a short-circuit current and an overload current that occur on the power feeding path as the abnormality.

2. The connector according to claim 1,
    wherein the open-close mechanical switch, when connecting the contact interface to the device to be charged or the electric power apparatus, brings the electric conductor into contact after the contact interface is connected, and when disconnecting the contact interface from the device to be charged or the electric power apparatus, opens the electric conductor before the contact interface is disconnected.

3. The connector according to claim 2,
    wherein the first abnormality detector further detects at least one of a ground fault current, a leakage current, a contact failure with the contact interface and a temperature abnormality of the contact interface that occur on the power feeding path as the abnormality.

4. The connector according to claim 3, further comprising:
    a signal receiver configured to receive an abnormality signal that is output from a second abnormality detector provided outside the connector main body,
    wherein the abnormality transmitter opens the electric conductor, when the signal receiver receives the abnormality signal.

5. The connector according to claim 2, further comprising:
    a signal receiver configured to receive an abnormality signal that is output from a second abnormality detector provided outside the connector main body,
    wherein the abnormality transmitter opens the electric conductor, when the signal receiver receives the abnormality signal.

6. The connector according to claim 1,
    wherein the first abnormality detector further detects at least one of a ground fault current, a leakage current, a contact failure with the contact interface and a temperature abnormality of the contact interface that occur on the power feeding path as the abnormality.

7. The connector according to claim 6, further comprising:
    a signal receiver configured to receive an abnormality signal that is output from a second abnormality detector provided outside the connector main body,
    wherein the abnormality transmitter opens the electric conductor, when the signal receiver receives the abnormality signal.

8. The connector according to claim 1, further comprising:
    a signal receiver configured to receive an abnormality signal that is output from a second abnormality detector provided outside the connector main body,
    wherein the abnormality transmitter opens the electric conductor, when the signal receiver receives the abnormality signal.

9. The connector according to claim 1,
    wherein the electric conductor is configured by a fixed contact maker and a movable contact maker that freely contacts with and separates from the fixed contact maker, and is accommodated in a first case made of an insulating material,
    the power disconnector has permanent magnets of which an N pole of one magnet and an S pole of another magnet are arranged opposite each other so as to sandwich an arc that is generated when the movable contact maker separates from the fixed contact maker, and a yoke that is magnetically connected to the permanent magnets and forms a magnetic path together with the permanent magnets, and
    the yoke is arranged outside the first case, and the permanent magnets are arranged outside the first case at a position corresponding to the fixed contact maker and the movable contact maker.

10. The connector according to claim 9,
    wherein the first case is configured by a second case that accommodates at least the power disconnector, the first abnormality detector, the abnormality transmitter and the open-close mechanical switch.

11. The connector according to claim 9,
wherein the permanent magnets are arranged in proximity to the fixed contact maker, and rotates according to a movement of the open-close mechanical switch to change a direction of a magnetic field.

12. The connector according to claim 9,
wherein the power cut-off switch includes an arc extinguisher that is configured by an arc running plate to transfer the arc that is generated when the movable contact maker separates from the fixed contact maker, and an arc extinguishing grid plate that extinguishes the arc that has arrived through the arc running plate.

13. The connector according to claim 1, wherein the open-close mechanical switch moves between the first position and the second position in response to a mechanical input when the first abnormality detector does not detect the abnormality.

14. A connector for electrically connecting between a device to be charged that has an electrical storage and an electric power apparatus that controls at least one of an electric power supply to the device to be charged and an electric power supply from the device to be charged, the connector comprising:
 a contact interface configured to electrically connect an electric cable, which is electrically connected to one of the device to be charged and the electric power apparatus, to the other of the device to be charged and the electric power apparatus that is not connected to the electric cable; and
 a connector main body,
 wherein the connector main body accommodates:
 the contact interface;
 a power disconnector configured to have an electric conductor that is serially connected to the electric cable, and open and close a power feeding path between the device to be charged and the electric power apparatus by bringing into contact or opening the electric;
 a first abnormality detector configured to detect an abnormality that occurs on the power feeding path and receive an abnormality signal from a source external to the connector main body;
 an abnormality transmitter configured to, when the first abnormality detector detects the abnormality or receives the abnormality signal, mechanically open the electric conductor; and
 an open-close mechanical switch configured to move between a position in which the electric conductor is brought into contact and a position in which the electric conductor is opened when the first abnormality detector does not detect the abnormality and does not receive the abnormality signal, and
 the first abnormality detector detects at least one of a short-circuit current and an overload current that occur on the power feeding path as the abnormality.

15. A connector for electrically connecting between a device to be charged that has an electrical storage and an electric power apparatus that controls at least one of an electric power supply to the device to be charged and an electric power supply from the device to be charged, the connector comprising:
 a contact interface configured to electrically connect an electric cable, which is electrically connected to one of the device to be charged and the electric power apparatus, to the other of the device to be charged and the electric power apparatus that is not connected to the electric cable; and
 a connector main body,
 wherein the connector main body accommodates:
 the contact interface;
 a power disconnector configured to have an electric conductor that is serially connected to the electric cable, and open and close a power feeding path between the device to be charged and the electric power apparatus by bringing into contact or opening the electric conductor;
 a first abnormality detector configured to receive an abnormality signal from a source external to the connector main body;
 an abnormality transmitter configured to, when the first abnormality detector receives the abnormality signal, mechanically open the electric conductor; and
 an open-close mechanical switch configured to move between a position in which the electric conductor is brought into contact and a position in which the electric conductor is opened when the first abnormality detector does not receive the abnormality signal, and
 the first abnormality detector detects at least one of a short-circuit current and an overload current that occur on the power feeding path as the abnormality.

\* \* \* \* \*